United States Patent [19]

Wantz

[11] Patent Number: 4,986,775
[45] Date of Patent: Jan. 22, 1991

[54] PROPELLER SHAFT BIDIRECTIONAL THRUST BEARING SYSTEM

[75] Inventor: David B. Wantz, Oshkosh, Wis.

[73] Assignee: Brunswick Corporation, Skokie, Ill.

[21] Appl. No.: 376,306

[22] Filed: Jul. 6, 1989

[51] Int. Cl.$^5$ .............................. B63H 5/12
[52] U.S. Cl. ..................... 440/83; 384/615; 440/78
[58] Field of Search ............ 440/78, 83, 900; 384/609, 615–622; 403/326, DIG. 7

[56] References Cited

U.S. PATENT DOCUMENTS

| | | | |
|---|---|---|---|
| 3,943,790 | 3/1976 | Meyer | 440/78 |
| 3,968,767 | 7/1976 | Blanchard | 440/78 |
| 4,382,639 | 5/1983 | McGuffie | 384/615 |
| 4,767,225 | 8/1988 | Iio | 384/620 X |
| 4,795,382 | 1/1989 | McCormick | 440/81 |
| 4,815,996 | 3/1989 | Carr | 440/83 X |

OTHER PUBLICATIONS

Truarc ® publication 6-65, "Interlocking Retaining Ring".

Primary Examiner—Joseph F. Peters, Jr.
Assistant Examiner—Edwin L. Swinehart
Attorney, Agent, or Firm—Andrus, Sceales, Starke & Sawall

[57] ABSTRACT

A bidirectional thrust bearing system for the propeller shaft of a marine propulsion system includes a substantially circumferential groove milled into the propeller shaft. A pair of substantially semicircular force transferring ring members are adapted for placement within the groove, and front and rear bearing collars are placed adjacent the force transferring members. Front and rear needle bearings are provided adjacent the front and rear bearing collars, respectively. A front bearing adapter, interconnected with the walls of the cavity within which the propeller shaft is disposed, transfers forward thrust in the propeller shaft to the gearcase. A rear bearing carrier, held in position by means of a ring nut mounted within the cavity, serves to transfer rearward thrust in the propeller shaft to the gearcase.

11 Claims, 2 Drawing Sheets

PROPELLER SHAFT BIDIRECTIONAL THRUST BEARING SYSTEM

BACKGROUND AND SUMMARY

This invention relates to a marine propulsion system, and more particularly to a thrust bearing system for a rotatable propeller shaft employed in a marine propulsion system.

In a conventional marine propulsion system, the gearing and clutch mechanism ar arranged such that clockwise rotation of the propeller shaft, and therefore of the propeller, results in forward thrust which moves the boat in a forward direction. During such forward operation, the thrust created by the propeller is transferred to the propeller shaft, which is typically used to seat the forward driving gear in its bearing cup in the forward end of the gearcase cavity. An axial forward force on the propeller shaft results from the forward thrust created by the propeller.

In some situations, it is necessary or desirable to employ a counterrotation system wherein the propeller blades are pitched so as to provide forward thrust during counterclockwise propeller shaft rotation. For example, in a dual drive installation, the two propellers rotating in opposite directions provide substantially cancelling propeller reaction torques, resulting in improved operation and handling. In a counterrotation drive system, the axial force in the propeller shaft cannot be used to stabilize the forward driving gears as is done in a right-hand rotation system. In essence, the propeller shaft axial thrust stop must be decoupled from the driving gears when the direction of input torque to the gearcase is the same as in a right-hand rotation unit.

To address this problem, a separate thrust bearing system is provided for absorbing the axial forces on the propeller shaft. In a typical prior art thrust bearing system, a circumferential flange is provided on the propeller shaft, and needle bearings are disposed on either side of the flange. A bearing adapter member, including a rearwardly facing bearing surface, is placed adjacent the forward gear needle bearing. A thrust washer is placed against the forward end of the bearing adapter member. A spacer and a thrust ring are provided between the thrust washer and an inwardly projecting lip formed on the walls of the cavity. These components serve to transfer axial forward forces on the propeller shaft to the gearcase. A bearing carrier member, including a forwardly facing bearing surface, is adapted for placement adjacent the rear needle bearing. The end portion of the cavity side walls is threaded, and is adapted to receive an externally threaded ring nut which bears against the end of the bearing carrier member to retain the system in place within the cavity. The bearing carrier member and the ring nut serve to transfer axial rearward forces on the propeller shaft to the gearcase.

The above described construction provides a highly satisfactory bearing system. However, the circumferential propeller shaft flange presents some difficulty, in that the flange is typically either formed integrally with the propeller shaft, or comprises a collar placed on the propeller shaft by means of snap rings. In the former situation, the propeller shaft must be formed from large diameter stock, which increases the cost of the shaft. In the latter situation, the snap rings can experience unsatisfactorily high stresses during operation.

Further, assembly difficulties are encountered due to the diameter of the propeller shaft flange relative to the internal diameter of the propeller shaft cavity. During some steps in assembling the gearing, clutch and shifting components, it is necessary or desirable to tip the shaft in order to attain necessary clearance or the like. With the gear in the torpedo nose supported by a different bearing arrangement and the flange in place, such tipping of the propeller shaft is impossible to accomplish. Then, too, the drive pinion could not be slid past the flange and installed into its pocket. Further, the presence of the flange on the propeller shaft made it impossible to use a crank-type shift system.

The present invention has as its object to alleviate the above-noted problems, and to provide a simplified bidirectional thrust bearing assembly. In accordance with the invention, the propeller shaft flange described above is eliminated. In its place, the propeller shaft is provided with a recess, which preferably extends about the entire circumference of the propeller shaft. In a preferred embodiment, the recess is semicircular in cross section. A pair of force transferring members are adapted for placement within the recess, including an inner surface for placement within the recess and an outer surface which projects outwardly of the outer surface of the propeller shaft. The force transferring members are preferably a pair of semicircular members which, when placed within the propeller shaft recess, substantially encircle the propeller shaft. Front and rear bearing collars are provided, each of which includes a surface adapted to engage the outer surface of the force transferring members projecting outwardly of the propeller shaft. The front and rear bearing collars are preferably adapted for side-by-side placement. The front bearing collar bears against the forward needle bearing, and the rear bearing collar bears against the rearward needle bearing. The bearing adapter and the bearing carrier are substantially identical in construction to that described above in the prior art system, for absorbing forward and rearward thrust in the propeller shaft and transferring forces therefrom to the gearcase housing.

BRIEF DESCRIPTION OF THE DRAWINGS

The drawings illustrate the best mode presently contemplated of carrying out the invention.

In the drawings.

DETAILED DESCRIPTION OF THE PRIOR ART

Figure 1:
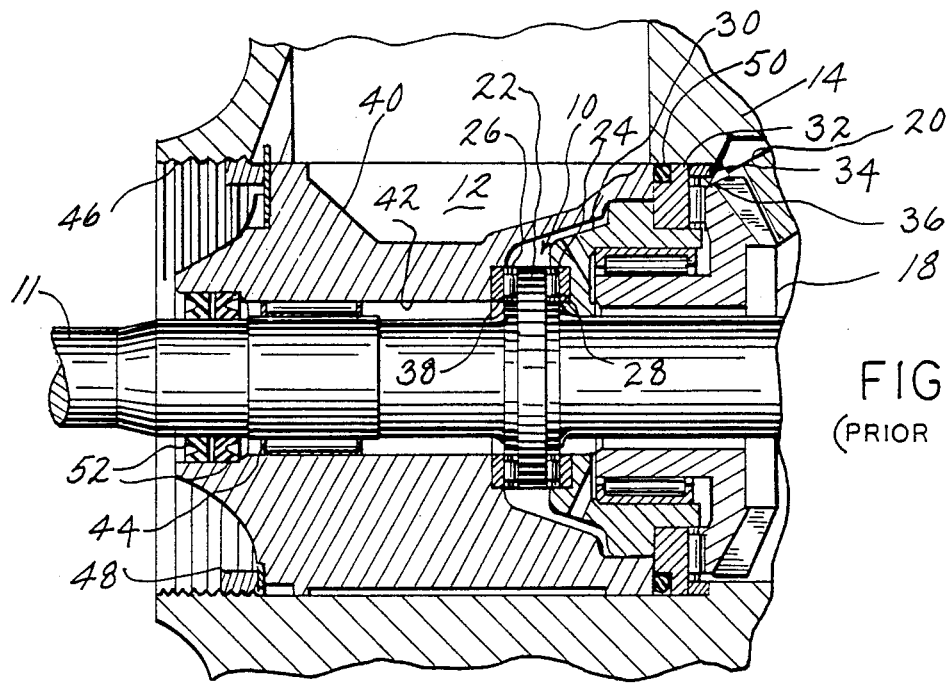
FIG. 1 is a partial sectional view of the gearcase of a marine drive unit, illustrating a prior art propeller shaft thrust bearing assembly for counterrotation.

As shown in FIG. 1, a prior art bidirectional thrust bearing system, shown generally at 10, is provided on a propeller shaft 11 adapted for placement within an axially extending torpedo cavity 12 formed in the lower portion of a gearcase 14. Propeller shaft 11 includes an inner rotatable portion mounted within cavity 12, and an outer portion to which a propeller is mounted, as is known. A driven bevel gear, shown at 18, meshes with a drive gear 20, which is connected to a drive shaft (not shown). In a counterrotation system, driven gear 18 is the forward gear. A clutch and shift system (not shown), including a clutch member splined to propeller shaft 11, is provided for selectively engaging forward gear 18 or a reverse gear (not shown), which faces forward gear 18 and also meshes with drive gear 20. Selective engagement of the clutch mechanism with either the forward gear or the reverse gear determines the direction of rotation of propeller shaft 11, and thereby the direction of boat propulsion.

Thrust bearing system 10 includes a flange 22 provided on propeller shaft 11. Flange 22 is formed integrally with propeller shaft 11. A front needle bearing, shown at 24, is adapted for placement adjacent the front face of flange 22, and a rear needle bearing 26 is adapted for placement adjacent the rear face of flange 22. A front thrust washer 28 is provided on a front retainer in the form of bearing adapter 30, which engages a thrust washer 32. A spacer shim 34 is positioned between the front face of thrust washer 32 and an inwardly projecting lip 36 provided on the side walls of cavity 12.

A thrust washer 38 is placed between rear needle bearing 26 and a rear retainer in the form of bearing carrier member 40. Bearing carrier member 40 includes an axial passage 42 through which propeller shaft 11 extends, and within which is mounted a roller bearing 44. The rearward end of the side walls forming cavity 12 are provided with internal threads 46, which are adapted to receive an externally threaded ring nut 48. Turning ring nut 48 so that it advances within cavity 12 causes ring nut 48 to engage the rear face of bearing carrier 40, which completes assembly of thrust bearing assembly 10 within cavity 12. An O-ring 50 is placed between the front surface of bearing carrier 40 and thrust washer 32 to provide a water-tight seal. A water tight seal is provided about the propeller shaft by means of a pair of seals 52 provided between the outer surface of propeller shaft 11 and the inner surface of passage 42 through bearing carrier 40.

DETAILED DESCRIPTION OF THE PREFERRED EMBODIMENT

Figure 2:
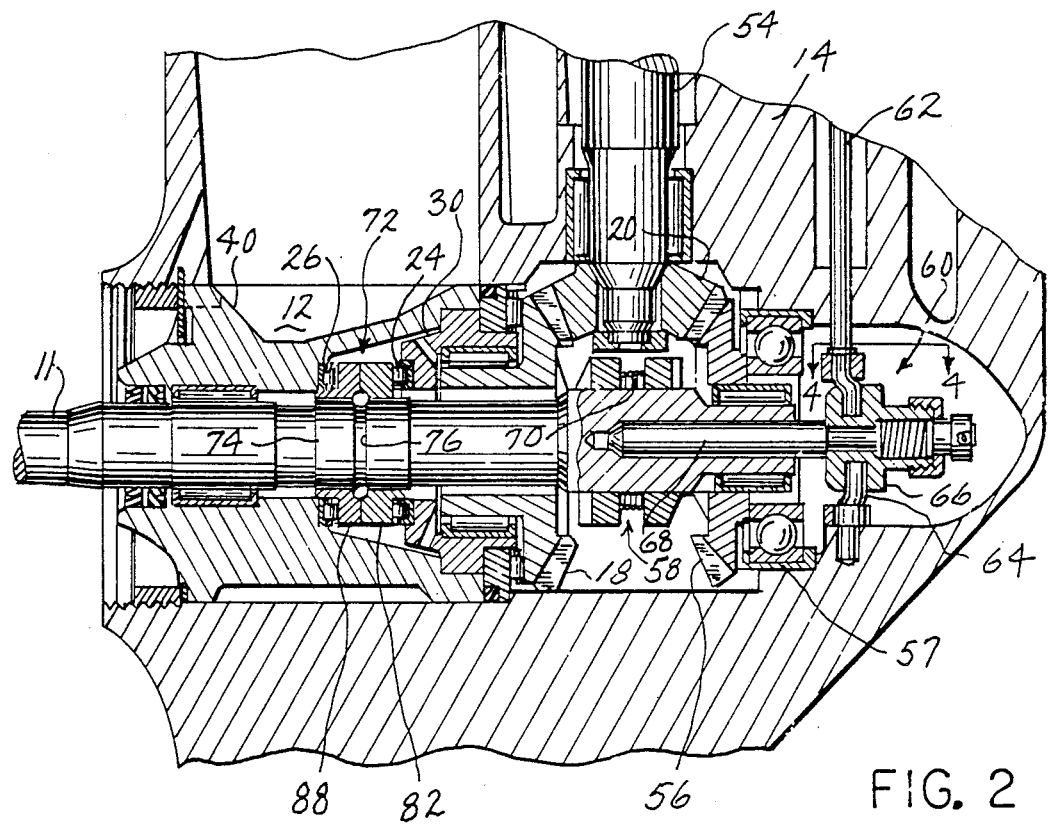
FIG. 2 is a partial sectional view somewhat similar to FIG. 1, showing the thrust bearing assembly of the present invention.

Reference is made to FIG. 2 to describe the thrust bearing system of the invention, and like reference characters will be used where possible to facilitate clarity. As shown in FIG. 2, drive gear 20 is mounted to a drive shaft 54. A reverse gear is shown at 56, which meshes with drive gear 20. A bearing assembly 57 is provided for rotatably mounting reverse gear 56 within cavity 12. A clutch 58 splined to propeller shaft 11 is provided for selectively coupling propeller shaft 11 with either forward gear 18 or reverse gear 56. A shift mechanism, shown generally at 60, is provided for actuating clutch 58. As shown, shift mechanism 60 includes a shift shaft 62 provided with a crank 64 at its lower end, which is fixed to gearcase housing 14. Crank 64 is engaged with a spool 66 having a clutch actuating shaft 68 extending rearwardly therefrom. Shaft 68 is engageable with a pin 70, so that axial movement of shaft 68 via spool 66 and crank 64 causes forward or rearward movement of clutch 58, as desired.

With further reference to FIG. 2, the bidirectional thrust bearing system of the invention is shown generally at 72. As shown, propeller shaft 11 is provided with an enlarged portion 74. A circumferential groove 76 is provided about enlarged portion 74 of propeller shaft 16. Groove 76 is preferably rounded so as to be substantially semicircular in cross section, as shown.

Figure 3:
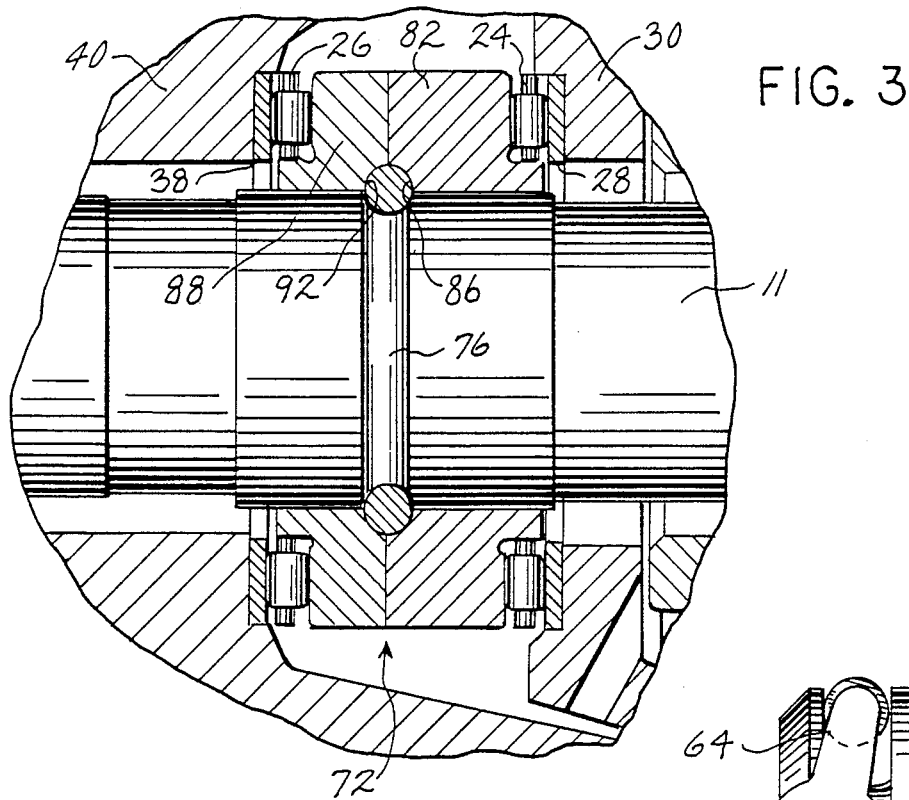
FIG. 3 is an enlarged partial sectional view of the thrust bearing assembly of FIG. 2.
Figure 4:
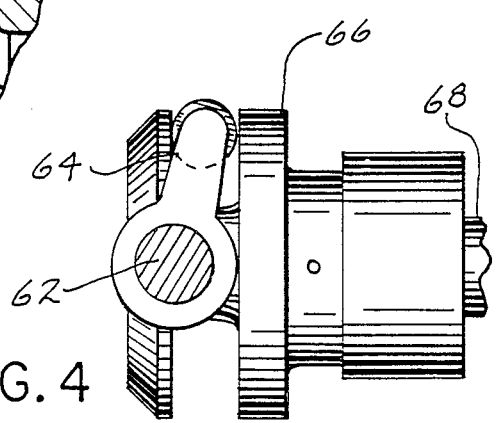
FIG. 4 is a partial top elevation view, with reference to line 4—4 of FIG. 2.
Figure 5:
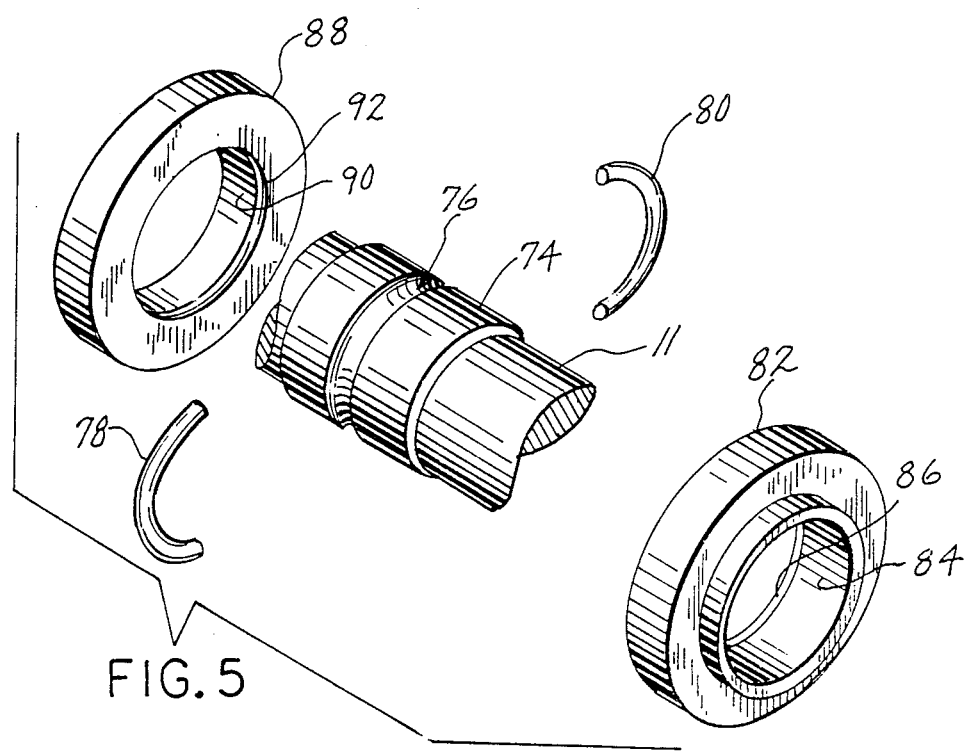
FIG. 5 is an exploded isometric view showing a portion of the propeller shaft, the front and rear bearing collars, and the force transferring members of the bidirectional thrust bearing system of the invention.

Reference is now made to FIGS. 3 and 5, which more explicitly detail thrust bearing system 72. Groove 76 is adapted to receive a pair of substantially semicircular members 78, 80 which, when placed within groove 76, substantially encircle propeller shaft 16. Each of members 78, 80 has an inner surface adapted for placement within groove 76, and an outer surface which projects outwardly of the outer surface of propeller shaft 16. A front bearing collar 82, which includes a passage 84 having an internal diameter slightly larger than the diameter of propeller shaft enlarged portion 74, is adapted for placement on the front end of propeller shaft enlarged portion 74. Front bearing collar 82 includes a rearwardly facing arcuate surface 86, which engages the frontwardly facing outer surface of members 78, 80.

In a like manner, a rear bearing collar 88 is adapted for placement on the rear end of propeller shaft enlarged portion 74. Rear bearing collar 88 includes an axial passage 90 therethrough, which has an internal diameter slightly larger than the external diameter of enlarged portion 74. Rear bearing collar 88 includes a frontwardly facing arcuate surface 92, which engages the rear outer surface of members 78, 80.

Referring to FIG. 3, the construction of bearing adapter 30 and rear bearing carrier 40 and their connection to gearcase 14 is substantially similar to that discussed with reference to FIG. 1, so as to minimize redesign of the prior art system and to take advantage of existing parts. With the described construction, forward thrust in propeller shaft 11 is transferred through members 78, 80 to front bearing collar 82, needle bearing 24, forward thrust washer 28 and bearing adapter 30. Rearward thrust in propeller shaft 11 is transferred through members 78, 80 to rear bearing collar 88, rear needle bearing 26, rear thrust washer 38 and rear bearing carrier 40. In this manner, forward and rearward forces in propeller shaft 11 are transferred to gearcase 14.

It has been found that the bidirectional thrust bearing assembly of the invention, as shown at 72, provides a highly satisfactory propeller shaft construction and means for transferring thrust forces from the propeller shaft. The two-piece nature of the force transfer members 78, 80, alleviates stress during operation and provides a simple and efficient system for transferring thrust forces from the propeller shaft to the bearing collars. The semicircular cross section of the circumferential groove, shown at 76, and the corresponding shape of the force transferring members 78, 80 also serves to reduce stress during transfer of thrust forces to the bearings. Additionally, the reduction in the maximum diameter of the propeller shaft by elimination of the flange eases assembly of the components within the gearcase cavity. Further, this bearing system allows use of a crank-type shift system in a counterrotation drive, which was previously impossible due to the presence of the flange on the propeller shaft.

Various alternatives and modifications are contemplated as being within the scope of the following claims particularly pointing out and distinctly claiming the subject matter regarded as the invention.

I claim:

1. In a marine propulsion system including a propeller shaft having an inner portion rotatably mounted within a housing and an outer portion projecting therefrom, and a propeller mounted to the projecting portion of said propeller shaft so as to be rotatable therewith, wherein rotation of said propeller shaft in a first direction results in an axial forward force on said propeller shaft acting substantially along the longitudinal axis of said propeller shaft, and rotation of said propeller shaft in a second direction results in an axial rearward force on said propeller shaft, the improvement comprising:

a recess formed about at least a portion of the circumference of the propeller shaft, with the propeller shaft transverse dimension forward of the recess being substantially equal to its transverse dimension rearward of the recess;

a force transferring member having an inner portion adapted for placement within said recess for engaging said propeller shaft, and having an outer portion projecting beyond the outer surface of said propeller shaft;

bearing collar means engageable with the outer portion of said force transferring member for transferring the axial forward and rearward forces on said propeller shaft;

forward and rearward bearing means engageable with said bearing collar means for transferring forward and rearward forces from said bearing collar means; and retainer means engaged with said forward and rearward bearing means and said housing for transferring forward and rearward forces from said forward and rearward bearing means to said housing.

2. The improvement according to claim 1, wherein said propeller shaft is substantially circular in cross section.

3. The improvement according to claim 2, wherein said force transferring member comprises a pair of members each having an arcuate inner surface for placement against said propeller shaft within said recess.

4. The improvement according to claim 3, wherein said pair of members are each substantially C-shaped and are constructed such that, when placed within said recess, the ends of one of said C-shaped members are disposed closely adjacent the ends of the other of said C-shaped members so as to substantially encircle said propeller shaft.

5. The improvement according to claim 1, wherein said retainer means comprises a bearing carrier and bearing adap including an axial passage through which said propeller shaft extends.

6. The improvement according to claim 5, wherein said housing includes an axially extending cavity within which said propeller shaft is disposed, and wherein said bearing carrier is adapted for placement within said cavity.

7. The improvement according to claim 6, wherein the walls of said cavity are provided at the rearward end of said cavity with internal threads, and said bearing carrier is retained within said cavity by means of a threaded member engaging said internal threads at the rearward end of said cavity and engaging said bearing carrier.

8. A bidirectional thrust bearing system for placement on a propeller shaft having an inner portion rotatably mounted within a housing and an outer portion to which a propeller is mounted, comprising:

a recess formed on the outer surface of said propeller shaft;

two or more force transferring members, each said member having an inner portion adapted for placement within said propeller shaft recess and an outer portion projecting beyond the outer surface of said propeller shaft;

a forward bearing collar means engaging the forward outer portion of said force transferring members;

a rearward bearing collar means engaging the rearward outer portion of said force transferring members;

forward retainer means engaging said forward bearing collar means and said housing; and rearward retainer means engaging said rearward bearing collar means and said housing.

9. The bidirectional thrust bearing system of claim 8, wherein said propeller shaft is substantially circular in cross section at said recess.

10. The bidirectional thrust bearing system of claim 9, wherein said two or more force transferring members comprise a pair of substantially semicircular members which, when placed within said propeller shaft recess, substantially encircle said propeller shaft.

11. In a marine propulsion system including a propeller shaft having an inner portion rotatably mounted within a housing and an outer portion projecting therefrom, and a propeller mounted to the projecting portion of said propeller shaft so as to be rotatable therewith, wherein rotation of said propeller shaft in a first direction creates an axial forward force on said propeller shaft acting substantially along the longitudinal axis of said propeller shaft and rotation of said propeller shaft in a second direction creates an axial rearward force on said propeller shaft, the improvement comprising:

forward and rearward thrust bearing means engaged with said propeller shaft, comprising:

a recess formed about at least a portion of the circumference of said propeller shaft;

force transferring ring means having an inner portion adapted for placement within said recess for engaging said propeller shaft, and having an outer portion projecting beyond the outer surface of said propeller shaft; and a bearing collar assembly engaged with said outer portion of said force transferring member, comprising a front bearing collar means engaged with the outer portion of said ring means and a rear bearing collar means engaged with the outer portion of said ring means;

first retainer means engaged with said front bearing collar means and said housing; and second retainer means engaged with said rear bearing collar means and said housing;

wherein the axial forward force on said propeller shaft during rotation of said propeller in said first direction is transferred through said front bearing collar means to said first retainer means and thereby to said housing to maintain said propeller shaft in proper position during forward operation, and wherein the axial rearward force on said propeller shaft during rotation of said propeller in said second direction is transferred through said rear bearing collar means to said second retainer means and thereby to said housing to maintain said propeller shaft in proper position during reverse operation.

* * * * *

UNITED STATES PATENT AND TRADEMARK OFFICE
CERTIFICATE OF CORRECTION

PATENT NO. : 4,986,775

DATED : January 22, 1991

INVENTOR(S) : David B. Wantz

It is certified that error appears in the above-identified patent and that said Letters Patent is hereby corrected as shown below:

Column 5, line 47 (claim 5, line 3), before "bearing" insert --a-- and change "adap" to --adapter,--.

Signed and Sealed this

Twenty-eighth Day of July, 1992

Attest:

DOUGLAS B. COMER

Attesting Officer

Acting Commissioner of Patents and Trademarks